United States Patent [19]
Johnson et al.

[11] 3,849,706
[45] Nov. 19, 1974

[54] LOGARITHMIC COMPUTING CIRCUIT

[75] Inventors: Richard A. Johnson, Murrysville; Jonn M. Fruhwald, North Braddock, both of Pa.

[73] Assignee: Westinghouse Electric Corporation, Pittsburgh, Pa.

[22] Filed: Oct. 4, 1973

[21] Appl. No.: 403,597

[52] U.S. Cl.......... 317/27 R, 317/33 R, 317/36 TD, 328/145

[51] Int. Cl. .......................................... H01h 47/18

[58] Field of Search...... 235/177; 317/36 TD, 27 R, 317/33 R; 328/145, 146, 160

[56] References Cited

UNITED STATES PATENTS

| | | | |
|---|---|---|---|
| 3,496,417 | 2/1970 | Tenenbaum | 317/36 TD |
| 3,544,846 | 12/1970 | Thompson | 317/36 TD |
| 3,624,409 | 11/1971 | Folsom et al. | 328/145 X |
| 3,710,189 | 1/1973 | Hagberg | 317/36 TD |

*Primary Examiner*—James D. Trammell
*Attorney, Agent, or Firm*—D. R. Lackey

[57] ABSTRACT

A circuit for raising a quantity represented by an input signal to a variable power employing a reference logarithmic signal to automatically bias the circuit as the value of the exponent is varied. An embodiment of the circuit utilizes an input signal proportional to the magnitude of overcurrent through an electric transmission line, with the exponential response thereto being applied across an integrating capacitor to yield a variable inverse time current relationship, providing a unique charging network for use with overcurrent protective apparatus.

9 Claims, 2 Drawing Figures

LOGARITHMIC COMPUTING CIRCUIT

BACKGROUND OF THE INVENTION

This invention relates to an improved logarithmic computing circuit for raising a quantity to a variable power using logarithmic function generators, and more particularly to a circuit which automatically biases itself as the gain factor, which determines the exponent, is varied. Still more particularly, the invention relates to an improved logarithmic computing circuit in an overcurrent relay system to provide a variety of inverse time current response characteristics.

In the solving of problems in the analog computer art, it is often necessary to determine the value of a quantity raised to a power, and logarithmic computing circuits have been developed to accomplish this result. In brief, this result is achieved by converting an input current signal to a voltage signal which is logarithmically related to the input current signal. This voltage signal is then amplified or attenuated by a gain factor. When the antilogarithm is taken, the output signal equals the input current signal raised to the power expressed by the gain factor. Therefore, by manually adjusting the gain factor, a variety of exponent values is provided for.

However, a problem with the prior art is the need for recalibration of the circuit whenever the gain factor is adjusted. This is accomplished by a bias circuit and requires special calibration equipment and extensive manual manipulations. An additional problem with the prior art is its poor stability for ambient temperature variations.

The art of electric network protection often requires circuitry for responding with time delay to an electrical signal; the amount of time delay being dependent upon the magnitude of the fault in the transmission line to be protected. Overcurrent relay systems have been developed wherein the time delay response of the system varies inversely with the magnitude of current above a predetermined current level. This inverse relationship is provided by an electrical storage device such as a capacitor. However, in order to generate a particularly desired inverse time response a charging circuit is generally included for charging the capacitor. In the prior art, these charging circuits consist of resistor-diode arrangements having a single, non-variable inverse time current relationship. A problem arises when it is desired to vary the response characteristics of the charging circuit to provide a variety of inverse time responses as would be required in the design of a universal overcurrent relay. The prior art circuits would require separate charging circuits for each time current relationship, necessitating multiple resistor-diode arrangements. U.S. Pat. No. 3,496,417 and 3,544,846 relate to electric relay systems and more specifically illustrate typical charging circuits of the prior art.

SUMMARY OF THE INVENTION

In accordance with this invention, an improved logarithmic computing circuit receives a primary current signal to be raised to a variable power at a primary input. A primary logarithmic function generator generates a primary log signal logarithmically related to the primary current signal. A reference current signal is applied to a reference input connected to a reference logarithmic function generator so that a reference log signal logarithmically related to the reference current signal is generated. This reference log signal automatically calibrates the logarithmic computing circuit for variations of the gain factor, and it provides automatic temperature compensation.

The primary and reference log signals are applied to a differential variable gain amplifier wherein the reference log signal is subtracted from the primary log signal to provide a differential signal. The differential signal is amplified or attenuated (i.e., multiplied) by the variable gain factor which corresponds to the value of the exponent in the mathematical computation. The resultant gain control signal is further altered by the addition of the reference log signal. This sum signal is applied to an antilogarithmic function generator to generate a computed output current signal logarithmically related to the sum signal and having a magnitude corresponding to the ratio of the primary current signal to the reference current signal raised to the power represented by the variable gain factor. Adjustment of the gain factor proportionally alters the circuit effect of both the primary current signal and the reference current signal, automatically compensating for such adjustment. Accordingly, a main feature of the circuit is to provide for the raising of a quantity to a variable power without the need to recalibrate the circuit after each change in the power or exponent. Another feature of the circuit is to provide matched scaling for both the logarithmic function generator and the antilogarithmic function generator with temperature compensation. Still another feature is the use of a minimum amount of electrical circuitry.

A preferred embodiment of the invention is a new and improved overcurrent relay system, wherein the primary current signal of the logarithmic computing circuit is made proportional to the line current of a power transmission line to be monitored and protected. In this embodiment, the output of the computing circuit is applied across a capacitor, yielding an inverse time current response which is dependent upon the magnitude of overcurrent and the setting of the gain factor in the differential variable gain amplifier. With a simple adjustment of the gain factor, the time current response of an overcurrent relay may be varied from only slightly inverse, at a gain factor of 0.5, to extremely inverse, at a gain factor of 3.0. As discussed previously, the gain factor can be varied without any bias recalibration, resulting in an efficient and practical universal overcurrent relay.

BRIEF DESCRIPTION OF THE DRAWING

The invention may be better understood, and further advantages and uses thereof more readily apparent, when considered in view of the following detailed description of exemplary embodiments taken with the accompanying drawings, in which.

DESCRIPTION OF PREFERRED EMBODIMENTS

Figure 1:
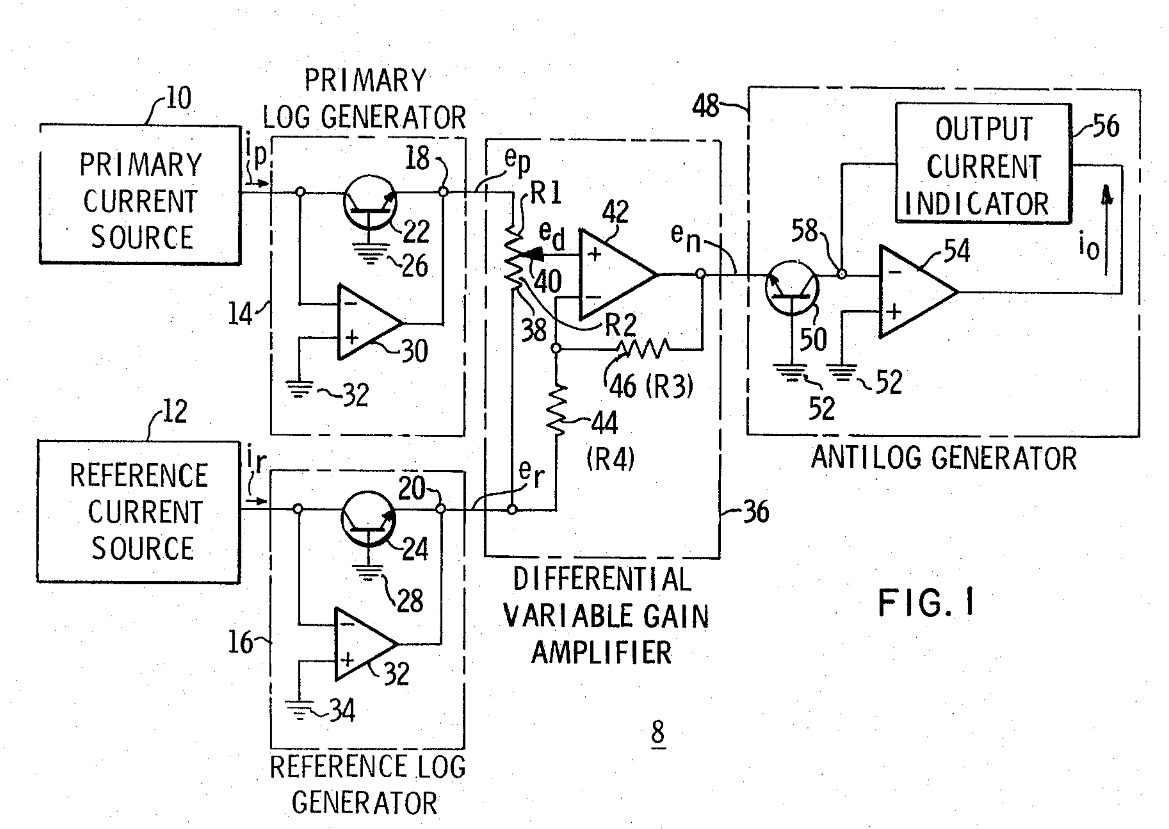
FIG. 1 is a partially schematic and partially block diagram illustrating a logarithmic computing circuit constructed according to the teachings of the invention.

Referring now to drawings, and FIG. 1 in particular, a primary current source 10 supplies primary current signal $i_p$ to a logarithmic computing circuit 8 and more specifically to the primary logarithmic function generator as designated by the phantom rectangle 14 (hereinafter referred to as primary log generator 14). The purpose of primary log generator 14 is to produce a primary log signal $e_p$ which is proportional to the logarithm of primary current signal $i_p$. The techniques and theoretical bases of this electrical operation are developed in detail in articles by N. L. Patterson, 34 Rev. Sci. Instr. 1,311 (Dec. 1963) and J. F. Gibbons and H. S. Horn, *IEEE Transactions on Circuit Theory*, Vol. CT–11,378 (Sept. 1964), the disclosures of which are incorporated by reference for completeness of disclosure. To provide this logarithmic output, primary log generator 14 includes transistor 22 of the NPN type, having its collector connected to primary current source 10, its base connected to ground 26, and its emitter connected to junction 18. Primary log generator 14 also includes an operational amplifier 30 having its inverting input connected to the collector of transistor 22, its non-inverting input connected to ground 32, and its output connected to junction 18. Junction 18 provides the primary log signal $e_p$ of primary log generator 14.

Another input to circuit 8 is provided by a reference current source 12 which supplies a reference current signal $i_r$ to a reference logarithmic function generator designated by the phantom rectangle 16 (hereinafter referred to as reference log generator 16). Reference log generator 16 performs a function similar to that of primary log generator 14 whereby a reference log signal $e_r$ is developed which is proportional to the logarithm of the reference current signal $i_r$. The reference log generator 16 includes transistor 24 of the NPN type, having its collector connected to the reference current source 12, its base connected to ground 28 and its emitter connected to junction 20. Reference log generator 16 also includes an operational amplifier 32 havings its inverting input connected to the collector of transistor 24, its non-inverting input connected to ground 34 and its output connected to junction 20. Junction 20 provides the reference log signal $e_r$ of reference log generator 16. The reference log signal $e_r$ is derived, instead of being directly provided by a reference voltage source and a potentiometer, in order to provide temperature compensation. The deriving circuit includes a transistor 24 which should be selected to have a temperature characteristic similar to that of transistor 22.

The output signals $e_p$ and $e_r$ of primary and reference log generators 14, and 15, respectively, are applied as input signals to the differential variable gain amplifier designated by the phantom rectangle 36 (hereinafter referred to as variable gain circuit 36). Variable gain circuit 36 performs three primary functions. First, it subtracts the reference log signal $e_r$ from the primary log signal $e_p$ by coupling the two signals from junctions 18 and 20 through adjustable resistor 38 providing a differential output signal $e_d$ at the selector arm 40 of resistor 38. Signal $e_d$ has the following relationship to signals $i_p$ and $i_r$: $e_d = e_p - e_r$, and since $e_p$ and $e_r$ are proportional to log $i_p$ and log $i_r$, respectively, $e_d \approx \log i_p - \log i_r$, which may be written:

$$e_d \approx \log (i_p/i_r) \ .$$

The second function of variable gain circuit 36 is to accomplish an amplification or attenuation of the differential output signal $e_d$ by a variable gain factor N, where N may be greater than, less than, or equal to unity, thus providing a gain control signal. This function is provided by operational amplifier 42 having its non-inverting input connected to receive signal $e_d$ via the movable arm 40. This arrangement permits the differential signal $e_d$ to be varied from zero to the total value of the difference between signals $e_r$ and $e_p$. To provide for gains greater than unity a fixed gain circuit is included within variable gain circuit 36. This fixed gain circuit includes resistors 44 and 46, with resistor 46 being connected in the feedback loop of operational amplifier 42 between the inverting input and output, and resistor 44 connected between the inverting input of operational amplifier 42 and junction 20 of reference log generator 16. The output of amplifier 42 is thus proportional to log $(i_p/i_r)$ raised to power N.

The connection between junction 20 and the inverting input of operational amplifier 42 provides the third function of the variable gain circuit 36. The third function is the summing of the reference log signal $e_r$ with the output of the amplifier 42, compensating for the earlier subtraction of signal $e_r$ from signal $e_p$ through resistor 38. The output voltage signal $e_n$ of the variable gain circuit 36 is thus a function of the difference between the log signals $e_p$ and $e_r$, multiplied by a variable gain factor N, summed together with reference log signal $e_r$, which may also be expressed as $\log (i_p/i_r)^N + \log i_r$.

Signal $e_n$ provides an input signal to an antilogarithmic function generator designated by the phantom rectangle 48 (hereinafter referred to as antilog generator 48). Signal $e_n$ automatically calibrates or biases the antilog generator 48 for all values of N within a reasonable range, and also provides automatic temperature compensation for the antilog generator. Antilog generator 48 provides a computed output current signal $i_o$ proportional to the antilogarithm of signal $e_n$. Antilog generator 48 includes transistor 50 of the NPN type, having its emitter connected to the output of variable gain circuit 36, its collector connected to junction 58, and its base connected to ground 52. Transistor 50 and transistor 22 of the primary log generator 14 should be matched. Also included in antilog generator 48 is an operational amplifier 54 having its non-inverting input connected to ground 52 and its inverting input tied to its output through junction 58, forming a feedback loop. An output current indicator 56, for indicating the value of the computed current signal $i_o$, is connected in this feedback loop. Since $i_o$ is antilogarithmically proportional to the input signal $e_n$, it may be expressed as the ratio of the primary current signal $i_p$ to the reference current signal $i_r$, raised to the power N, times the reference current signal $i_r$, i.e., $(i_p/i_r)^N\, i_r$.

The operation of the circuit may be more clearly understood by reference to the following mathematical analysis.

A general expression defining the logarithmic operating region of a transistor is given by:

$$V_{BE} = -(KT/q)\ln(I_c/I_{es}) \qquad (1)$$

where $V_{BE}$ is the base-emitter voltage; K is Boltzmann's constant; $q$ is the electron charge; $I_c$ is the collector current; and $I_{es}$ is the emitter-base diode saturation current.

Therefore, the primary log signal $e_p$ of primary log generator 14, in terms of the primary current signal $i_p$, is expressed by:

$$e_p = -(KT/q) \ln(i_p/I_{es}) \quad (2)$$

and similarly, the reference log signal $e_r$ of the reference log generator 16 in terms of the reference current signal $i_r$, is expressed by:

$$e_r = -(KT/q) \ln(i_r/I_{es}) \quad (3)$$

When signals $e_p$ and $e_r$ are coupled through resistor 38, the differential signal $e_d$ applied to operational amplifier 42 may be expressed in terms of $R_1$ and $R_2$, with $R_1$ and $R_2$ representing the values of the resistance between movable arm 40 and junction 18, and movable arm 40 and junction 20, respectively. This expression is given by:

$$e_d = (e_p - e_r) ([R_2/R_1 + R_2]) + e_r \quad (4)$$

The output signal $e_n$ of variable gain circuit 36 is a function of $e_d$ and $e_r$, and resistors 44 and 46 designated as $R_4$ and $R_3$ respectively, and is expressed by:

$$e_n = (e_d - e_r) (1 + [R_3/R_4]) + e_r \quad (5)$$

Combining Equations 4 and 5 yields:

$$e_n = (e_p - e_r) ([R_2/R_1 + R_2]) (1 + [R_3/R_4]) + e_r \quad (6)$$

When the gain in the circuit represented by the two resistance quantities of Equation 6 is allowed to equal N, equation 6 may be written as:

$$e_n = (e_p - e_r) N + e_r \quad (7)$$

Substituting Equations 2 and 3 into Equation 7 and reducing to its simplest form yields:

$$e_n = -(KT/q) \ln [(i_p/i_r)^N (i_r/I_{es})] \quad (8)$$

This output voltage signal $e_n$ of the variable gain circuit 36 provides the base-emitter voltage for transistor 50 of antilog generator 48, generating computed output current signal $i_o$ which may be generally expressed in terms of voltage $e_n$ by:

$$i_o = I_{es} [e^{(q/KT)(-e_n)} - 1] \quad (9)$$

Substituting the value of $e_n$ developed in Equation 8 into Equation 9 and reducing to its simplest form yields:

$$i_o = [(i_p/i_r)]^N i_r - I_{es} \quad (10)$$

Signal $i_r$ is selected to be much larger than the emitter base diode saturation current $I_{es}$.

Therefore, Equation 10 may be written as:

$$i_o \approx [(i_p/i_r)]^N i_r \quad (11)$$

Equation 11 provides the desired relationship wherein the power N may be changed without requiring circuit recalibration. The reference log signal $e_r$ automatically calibrates the circuit by properly biasing the emitter of transistor 50 for all values of N within a reasonable range. The manner in which the reference log signal $e_r$ is derived also automatically compensates the circuit for temperature.

Figure 2:
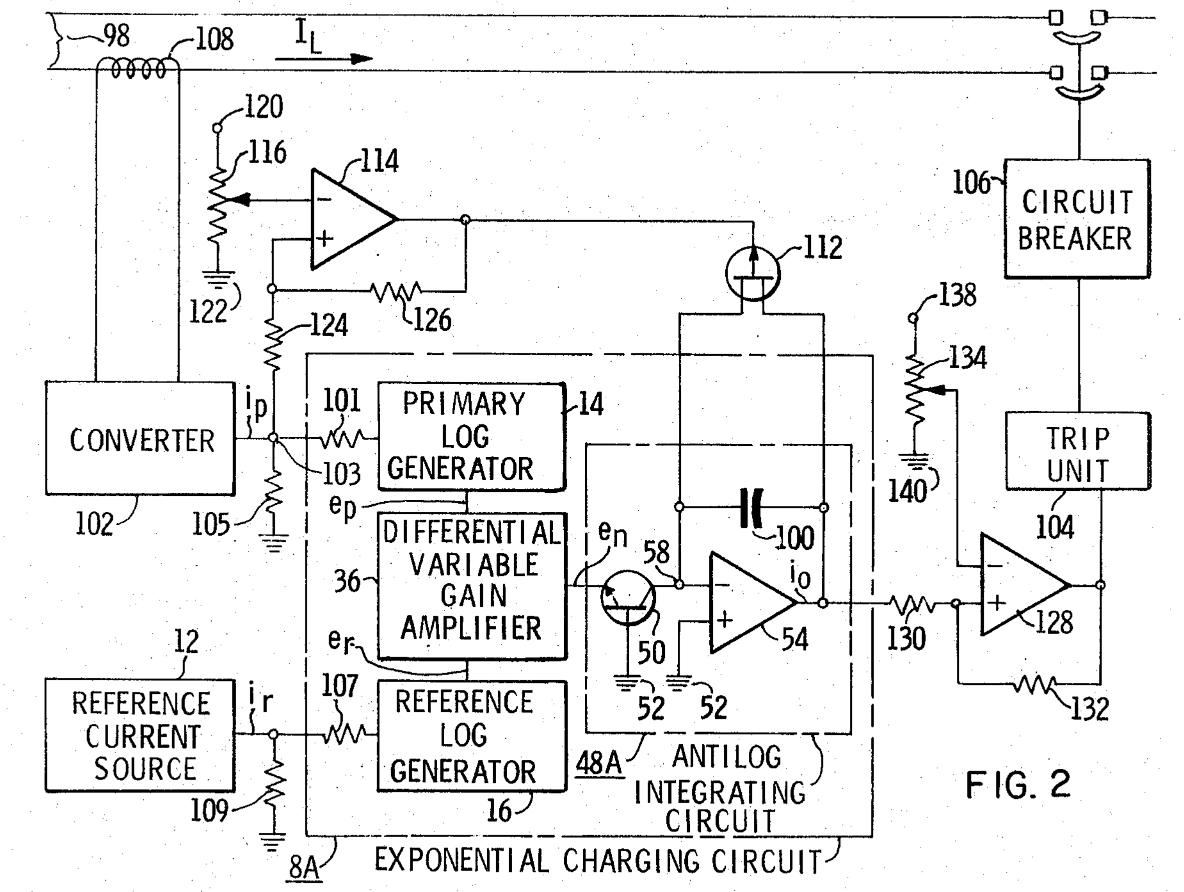
FIG. 2 is an embodiment of the invention illustrating a protective-relaying combination capable of a plurality of time-overcurrent response characteristics.

FIG. 2 illustrates an embodiment of the invention wherein the circuit of FIG. 1 is used in a protective-relaying combination or more specifically in an overcurrent relay system. In order to simplify the drawing, conventional circuitry is presented in block diagram form in FIG. 2. Reference may be made to U.S. Pat. No. 3,496,417 and 3,544,846 for a more detailed description of the basic operations of electric relay systems.

As shown in FIG. 2, the circuit of FIG. 1 is represented as exponential charging circuit 8A with one change being made as shown in antilog integrating circuit 48A which corresponds to antilog generator 48 of FIG. 1; the change being the addition of a charging capacitor 100 into the negative feedback loop of operational amplifier 54.

The overcurrent relay system includes a converter 102 which derives from the line current $I_L$ of an electrical power circuit 98, a primary direct current $i_p$ which is applied to the exponential charging circuit 8A for the purpose of controlling the charging of a storage device such as capacitor 100. When the voltage across capacitor 100 exceeds a predetermined value, a translating signal is applied to a trip unit 104, which trips a circuit breaker 106.

More specifically, a current transformer 108 provides a signal responsive to the line current $I_L$, and this signal is applied to converter 102. Converter 102 provides a primary direct current signal $i_p$ proportional to the magnitude of the line current $I_L$. This direct current signal $i_p$ is applied to log generator 14 of exponential charging circuit 8A. The current signal $i_p$ may be applied to primary log generator 14 via a resistor network which includes a resistor 101 connected between converter 102 and primary log generator 14, and resistor 105 connected from the junction 103 between converter 102 and resistor 101, to ground.

A direct current signal $i_r$ is applied to reference log generator 16 of charging circuit 8A. The magnitude of reference direct current $i_r$ is selected to be much larger than the emitter base diode saturation current $I_{es}$ of transsistor 50 as hereinbefore set forth, so $I_{es}$ will be negligibly small compared with the other term of equation 10. Signal $i_r$ is provided by reference current source 12 and is applied as an input signal to reference log generator 16 via a resistor network which includes resistors 107 and 109. As described relative to FIG. 1, the output signals of the log generators 14 and 16 are voltages proportional to the logarithm of their respective input currents and these signals or voltages are applied to differential variable gain amplifier 36 to provide a variable differential signal $e_n$. The output of differential variable gain amplifier 36 is a voltage function of the difference between the two input signals amplified by the variable gain factor. Signal $e_n$ is applied to an antilog integrating circuit 48A. Circuit 48A generates a computed output signal $i_o$ which is the antilogarithm of the variable differential signal $e_n$ which can be expressed as a function of the ratio of the line current to the reference current raised to the variable exponent N.

Capacitor 100 integrates the computed output current signal $i_o$, producing a voltage across capacitor 100 having a charging time that varies directly with the magnitude of the signal $i_o$. When this voltage exceeds a predetermined value a translating signal is applied to the trip unit 104 for actuating circuit breaker 106.

To provide for both the antilog and integration operations, antilog integrating circuit 48A includes a transistor 50 of the NPN type having its emitter connected to receive signal $e_n$ from the output of differential variable gain amplifier 36, its base connected to ground 52 and its collector connected to junction 58. Also included is an operational amplifier 54 having its non-inverting input connected to ground, its inverting input tied to its output through junction 58 forming a feedback loop wherein the computed output signal is produced. Capacitor 100 is connected in this feedback loop between junction 58 and the output of operational amplifier 54.

When the value of the line current is less than the desired minimum pickup current the relay system should remain inactive, and no voltage should appear across capacitor 100. To accomplish this, capacitor 100 is shunted for all values of line current $I_L$ below the minimum pickup current of the overcurrent relay system. The shunt is provided by a switching device such as field effect transistor (FET) 112 of the normally conducting P-channel type having its source and drain connected across capacitor 100 and its gate connected to the output of an operational amplifier 114. Operational amplifier 114 acts as a difference amplifier having its inverting input connected to the tap of an adjustable resistor 116. Adjustable resistor 116 is connected between a source of reference potential applied to terminal 120 and ground 122. The reference potential at terminal 120 is adjusted to a level proportional to the desired minimum pickup current of the relay. In other words, resistor 116 is adjusted to provide a voltage at its adjustable arm which is equal to the voltage which appears across resistor 105 when current signal $i_p$ reaches the minimum pickup level of the overcurrent relay. The non-inverting input of operational amplifier 54 is connected to the output of converter 102 through a positive gain circuit comprising resistors 124 and 126. Resistor 126 is connected between the non-inverting input of operational amplifier 114 and its output, and resistor 124 is connected between the non-inverting input and junction 103 of converter 102.

Operational amplifier 114 thus compares a voltage proportional to the minimum pickup current to a voltage proportional to the line current. When the line current is less than the minimum pickup current, the output of amplifier 114 is negative and FET 112 remains in its normally conducting state thus shunting capacitor 100. When the line current exceeds the minimum pickup current, a positive output signal amplified by the gain circuit of resistors 124 and 126 is produced by amplifier 114 causing FET 112 to open the circuit between its source and drain, allowing capacitor 100 to charge in accordance with the magnitude of line overcurrent and the setting of the exponent N in variable gain circuit 36.

When a line overcurrent occurs and capacitor 100 begins to charge, it is necessary at a particular charge or voltage level to provide a translating signal to trip unit 104 to actuate circuit breaker 106 and open a portion of the line to be protected. This translating signal is provided by operational amplifier 128 which compares the voltage level of capacitor 100 to a reference voltage level and when the two are equal a signal is sent to trip unit 104. The non-inverting input of operational amplifier 128 is connected to the output of antilog integrating circuit 48A via resistor 130, and a resistor 132 is connected between the non-inverting input and output of amplifier 128. These resistors 130 and 132 provide a positive feedback. The inverting input of amplifier 128 is connected to the tap of an adjustable resistor 134. Resistor 134 is connected between a reference voltage applied to terminal 138 and ground 140. The voltage at the adjustable arm of resistor 134 is adjusted to select the desired time delay characteristic of the relay system.

In operation, the relay system of FIG. 2 compares the line current $I_L$ in the circuit indicated generally at 98 with a selected minimum pickup current proportional to the potential at the adjustable arm of resistor 116. When $I_L$ is less than the minimum pickup current, capacitor 100 is shunted by FET 112. When $I_L$ is greater than the minimum pickup current, FET is energized and the shunt circuit is opened, allowing capacitor 100 to charge. The charge on capacitor 100 is initiated by a magnitude of line overcurrent produced in current transformer 108 and applied to the exponential charging circuit 8A via converter 102. Capacitor 100 provides an output voltage which may be expressed as:

$$v(t)_0 = \frac{1}{C}\int_0^t \left(\frac{i_p}{i_r}\right)^N i_r\, d(t) \quad (12)$$

where:

$v_o(t)$ is the output voltage of capacitor 100 with respect to time

C is the value of capacitor 100

$i_p$ is proportional to the line current $I_L$ $i_r$ is the reference current, and N is the gain factor of the differential variable gain circuit 36.

From equation 12 the voltage across capacitor 100 is shown to vary with time depending on the magnitude of signal $i_p$, and thus $I_L$, and the degree of the exponent N. By integrating this equation and solving for time the following expression is obtained:

$$T \alpha \frac{K}{\left(\frac{i_p}{i_r}\right)^N} \quad (13)$$

where:

T is time in seconds, and

K is a proportionality constant.

Thus the time delay of the overcurrent relay is inversely proportional to the line overcurrent raised to a variable power N which may be adjusted to provide an infinite variety of inverse time-overcurrent response characteristics.

Although the invention has been described with reference to certain specific embodiments thereof, numerous modifications falling within the spirit and scope of the invention are possible.

We claim as our invention:

1. A logarithmic computing circuit for generating a computed output signal representing the value of a quantity raised to a variable power comprising:

means providing a primary current signal corresponding to the quantity to be raised to a variable power;

means providing a reference current signal;

a primary logarithmic function generator providing a primary log signal logarithmically related to said primary current signal;

a reference logarithmic function generator providing a reference log signal logarithmically related to said reference current signal;

means providing a differential signal responsive to the difference between said primary and reference log signals;

gain control means having an adjustable gain factor related to the desired value of the variable power and providing a gain control signal responsive to said differential signal as modified by the value of said gain factor;

summing means adding said reference log signal to the gain control signal of said gain control means;

and an antilogarithmic function generator responsive to the output of said summing means to provide a computed output signal corresponding to the magnitude of the primary current signal raised to a variable power, said antilogrithmic function generator being automatically calibrated for the gain selected in said gain control by that portion of the output of said summing means which is responsive to said reference log signal.

2. The circuit of claim 1 wherein the means providing the differential signal, the gain control means and the summing means are provided by a differential variable gain amplifier including an operational amplifier having an inverting and non-inverting input and an output; a fixed gain circuit connected between said inverting input and said output responsive to said reference log signal, resistance means connected between said primary and reference log signals; and a resistance varying movable adjustment means connecting said resistance means to the non-inverting input of said operational amplifier.

3. The circuit of claim 1 wherein the reference logarithmic function generator has a temperature responsive characteristic similar to that of the primary logarithmic function generator and antilogarithmic function generator, automatically compensating the circuit for temperature change.

4. A protective-relaying combination with universal time delay response characteristics for monitoring and protecting an electrical system, comprising:

means deriving a primary current signal responsive to a quantity of the electrical system to be monitored, means providing a reference current signal, logarithmic computing means responsive to said primary and reference current signals and providing a computed output signal related to the ratio of said primary and reference current signals raised to a variable power, a storage device, means coupling said storage device to be charged in accordance with said computed output signal, means responsive to said primary current signal preventing the charging of said storage device until said primary current signal reaches a predetermined magnitude, and translating means responsive to the voltage across said storage device to provide protection for the electrical system.

5. The protective-relaying combination of claim 4 wherein the logarithmic computing means providing the computed output signal includes:

a primary logarithmic function generator providing a primary log signal logarithmically proportional to the primary current signal, a reference logarithmic function generator providing a reference log signal logarithmically proportional to the reference current signal, differential variable gain amplifier means having a variable gain factor related to the desired value of the variable power and providing a variable differential signal dependent upon the difference between the primary and reference log signals as modified by said gain factor, and an antilogarithmic function generator providing a computed output signal antilogarithmically related to said variable differential signal and corresponding to the ratio of the primary current signal to the reference current signal raised to a variable power.

6. The protective-relaying combination of claim 5 wherein the primary and reference logarithmic function generators each include an operational amplifier having a transistor in circuit with both the input and the output of the operational amplifier, with said transistors having similar temperature responsive characteristics, to automatically compensate for temperature variation.

7. The protective-relaying combination of claim 5 wherein the antilogarithmic function generator includes an operational amplifier having inputs and an output, and a transistor, said transistor being connected between the output of the differential variable gain amplifier and an input of said operational amplifier.

8. The protective-relaying combination of claim 5 wherein the differential variable gain amplifier includes an operational amplifier having inverting and non-inverting inputs and an output, a fixed gain circuit connected between said inverting input and said output responsive to the reference log signal, resistance means connected between the primary and reference log signals, and a resistance varying movable adjustment means connecting said resistance means to said non-inverting input.

9. The protective-relaying combination of claim 4 wherein the means preventing the charging of the storage device until the primary current signal reaches a predetermined magnitude includes voltage comparing means providing a signal indicating the condition when the reference direct current magnitude exceeds the primary direct current magnitude and a switching device responsive to this condition to shunt said storage device.

* * * * *